United States Patent
Zhao (10) Patent No.: US 9,088,242 B2
(45) Date of Patent: *Jul. 21, 2015

(54) DAUGHTER CIRCUIT BOARD OF ELECTRONICALLY COMMUTATED MOTOR FOR INTERFACE SIGNAL CONVERSION

(71) Applicant: Zhongshan Broad-Ocean Motor Manufacturing Co., Ltd., Zhongshan (CN)

(72) Inventor: Yong Zhao, Zhongshan (CN)

(73) Assignee: Zhongshan Broad-Ocean Motor Manufacturing Co., Ltd., Zhonghshan (CN)

( * ) Notice: Subject to any disclaimer, the term of this patent is extended or adjusted under 35 U.S.C. 154(b) by 351 days.

This patent is subject to a terminal disclaimer.

(21) Appl. No.: 13/779,707

(22) Filed: Feb. 27, 2013

(65) Prior Publication Data

US 2013/0169200 A1    Jul. 4, 2013

Related U.S. Application Data

(63) Continuation-in-part of application No. PCT/CN2011/073066, filed on Apr. 20, 2011.

(51) Int. Cl.
| | |
|---|---|
| *H01K 1/00* | (2006.01) |
| *H01K 1/14* | (2006.01) |
| *H02P 1/00* | (2006.01) |
| *H02P 31/00* | (2006.01) |
| *H02P 6/08* | (2006.01) |

(52) U.S. Cl.
CPC . *H02P 31/00* (2013.01); *H02P 6/08* (2013.01)

(58) Field of Classification Search
USPC .......................................... 318/255
See application file for complete search history.

(56) References Cited

U.S. PATENT DOCUMENTS

| | | | | |
|---|---|---|---|---|
| 6,825,634 | B2 * | 11/2004 | Tatar et al. | 318/625 |
| 8,271,695 | B2 * | 9/2012 | Zhao | 710/10 |
| 8,650,348 | B2 * | 2/2014 | Zhao | 710/301 |
| 8,885,349 | B2 * | 11/2014 | Zhao et al. | 361/748 |
| 8,934,258 | B2 * | 1/2015 | Zhao | 361/764 |
| 2010/0220449 | A1 * | 9/2010 | Yu | 361/748 |
| 2011/0191502 | A1 * | 8/2011 | Zhao | 710/10 |
| 2012/0142201 | A1 * | 6/2012 | Zhao | 439/78 |
| 2013/0175967 | A1 * | 7/2013 | Zhao | 318/558 |
| 2013/0241455 | A1 * | 9/2013 | Lu et al. | 318/400.37 |
| 2013/0258612 | A1 * | 10/2013 | Zhao et al. | 361/748 |
| 2014/0320052 | A1 * | 10/2014 | Zhao et al. | 318/400.32 |
| 2015/0061473 | A1 * | 3/2015 | Zhao et al. | 310/68 R |

\* cited by examiner

*Primary Examiner* — Kawing Chan
(74) *Attorney, Agent, or Firm* — Matthias Scholl P.C.; Matthias Scholl (57) ABSTRACT

A daughter circuit board of an electronically commutated motor for interface signal conversion, including circuit units integrated on the daughter circuit board and five ports for communicating with a control system of a user terminal. The five ports include: a R/T port, a Vcc port, a Common port, a Vsp port, and an FG port.

12 Claims, 7 Drawing Sheets

DAUGHTER CIRCUIT BOARD OF ELECTRONICALLY COMMUTATED MOTOR FOR INTERFACE SIGNAL CONVERSION

CROSS-REFERENCE TO RELATED APPLICATIONS

This application is a continuation-in-part of International Patent Application No. PCT/CN2011/073066 with an international filing date of Apr. 20, 2011, designating the United States, now pending, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a daughter circuit board of an electronically commutated motor (ECM) for interface signal conversion.

2. Description of the Related Art

Figure 1:
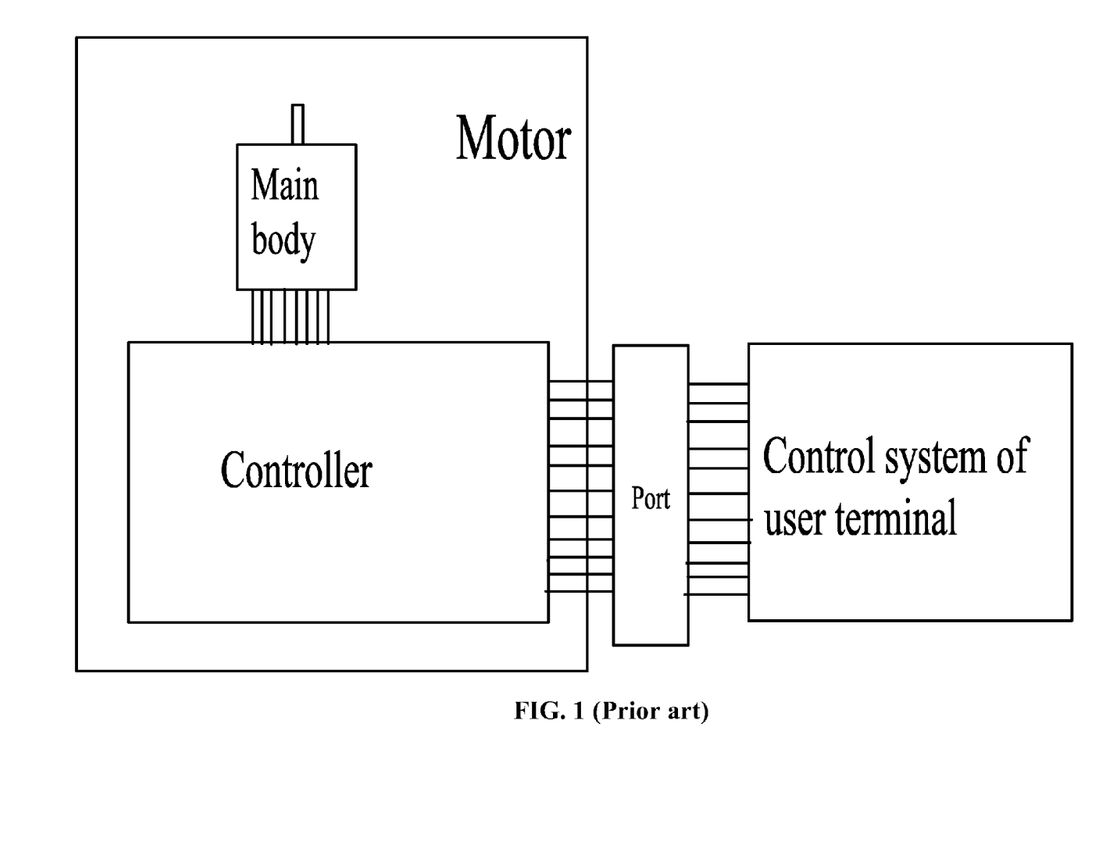
FIG. 1 is a schematic diagram of connection between a motor controller and a control system of a user terminal in the prior art.
Figure 2:
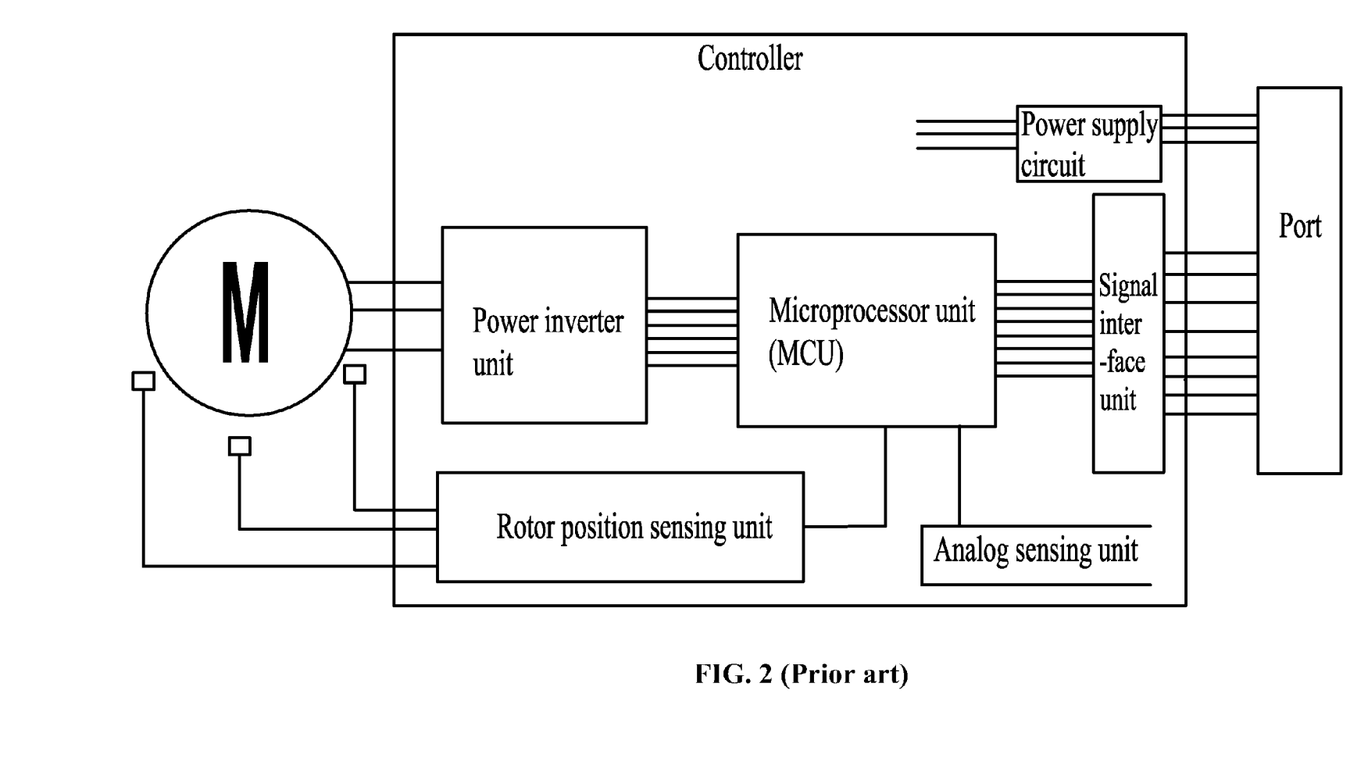
FIG. 2 is a block diagram of a motor controller in the prior art.

As shown in FIGS. 1 and 2, a conventional ECM includes a main body and a controller. The main body has a stator assembly and a rotor assembly. The controller should correspond with both the main body and a control interface of a control system of a user terminal. Different control systems of user terminals correspond with different control signals. For example, both a control system of an air-conditioner and a control system of a washing-machine belong to control system of user terminals, but the control signals thereof are completely different. Conventionally, for each specific control system of a user terminal, a motor and a controller thereof are developed accordingly, which, however, brings about the following disadvantages: 1) a variety of motors have to be manufactured, which results in inconvenient management and standardization; 2) the development for motors takes time and increases the production costs; and 3) the newly-developed motor has a narrow application scope and is inconvenient for popularization.

To solve the above-described problems, a motor controller including a mother circuit board and a daughter circuit board butted therewith has been introduced. Main functional circuits of the motor controller are disposed on the mother circuit board. Different interface circuit units and identify circuits are disposed on different daughter circuit boards. When one daughter circuit board is butted with the mother circuit board, the identify circuit of the daughter circuit board sends messages to a central control and process unit of the mother circuit board. Thereafter, the central control and process unit automatically assigns an input/output port for the daughter circuit board. Thus, through cooperation with various daughter circuit boards, the motor controller can be applied to various occasions, i.e., has a wide application. Consequently, the motor manufactures do not need to produce a large number of motors, thereby reducing the management and development costs, simplifying the production process, and improving the efficiency.

Figure 3:
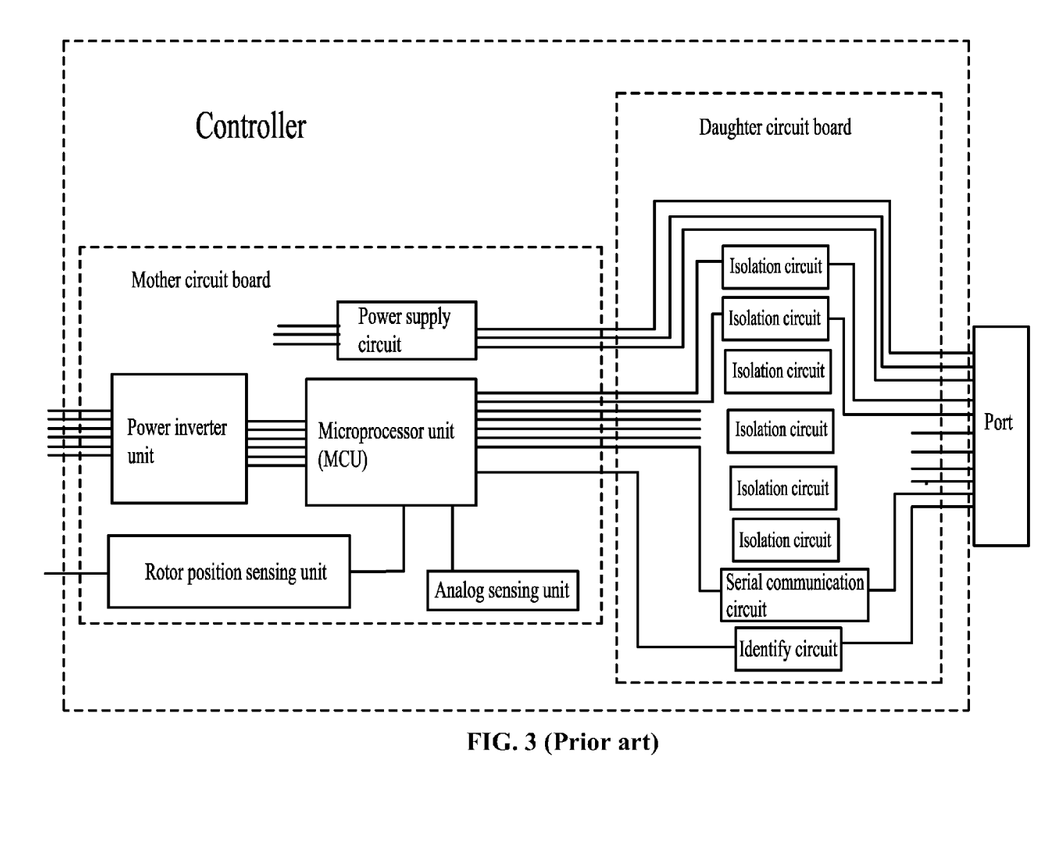
FIG. 3 is a schematic diagram of a motor controller having a mother and a daughter circuit board in the prior art.
Figure 4:
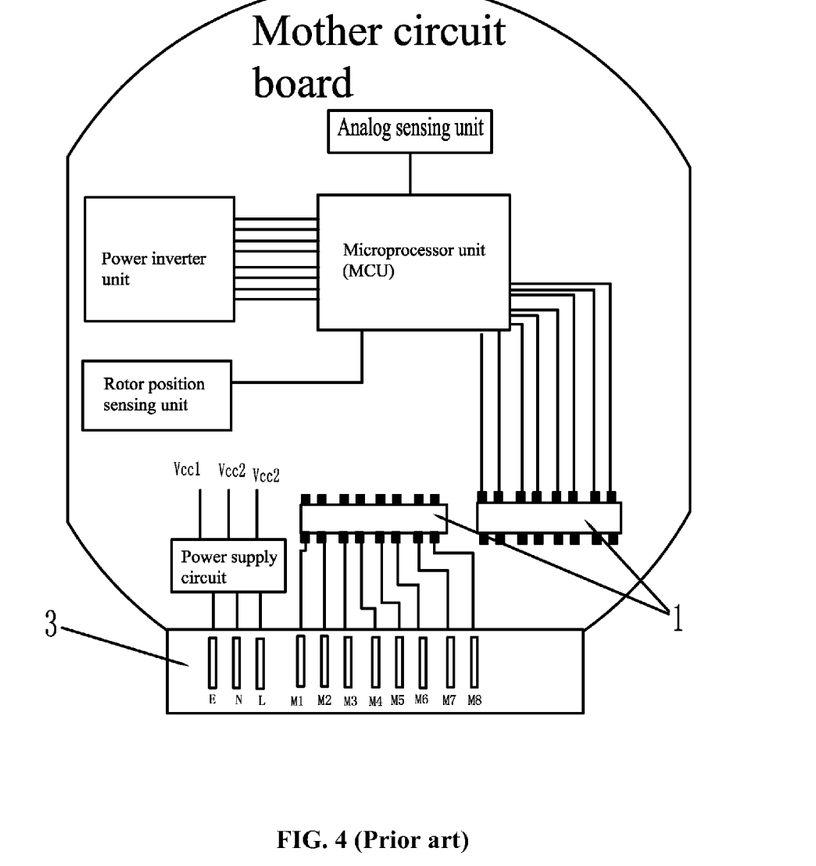
FIG. 4 is a schematic diagram of a mother circuit board of a motor controller in the prior art.
Figure 5:
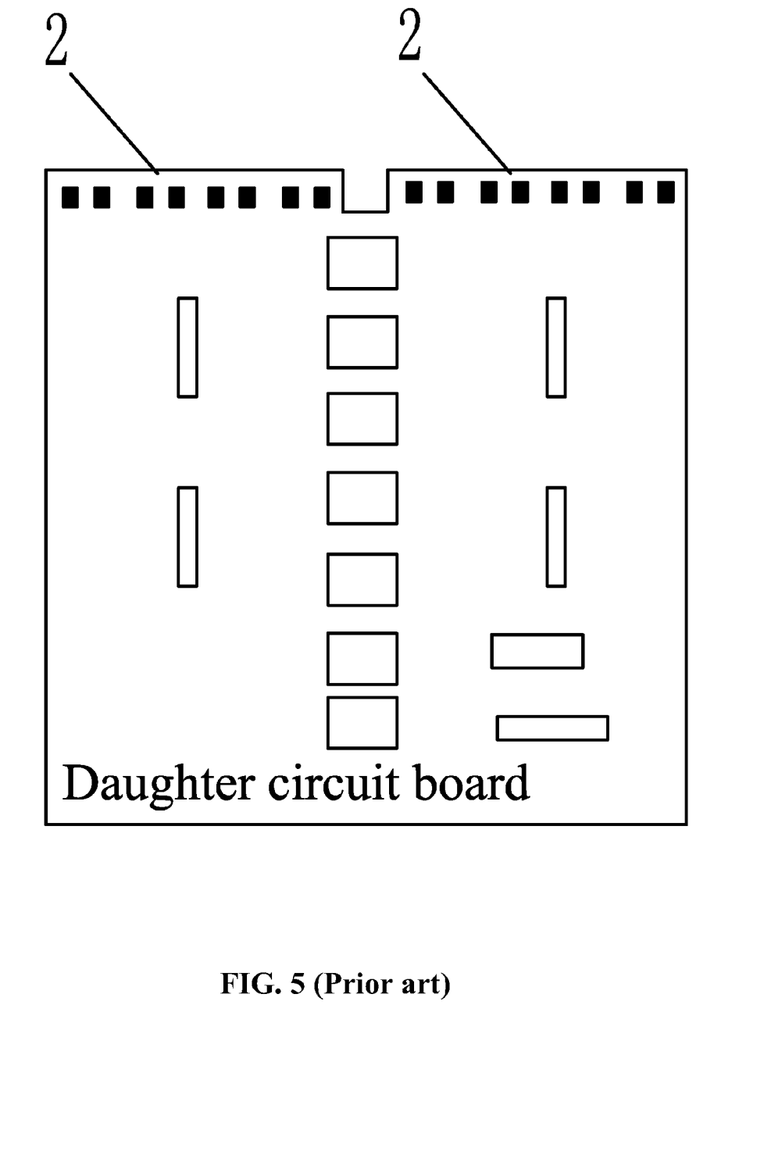
FIG. 5 is a schematic diagram of a daughter circuit board of a motor controller in the prior art.

Specifically, as shown in FIGS. 3-5, a motor controller includes a microprocessor unit, a signal interface unit, and an identify circuit. The microprocessor unit is disposed on a mother circuit board. The signal interface unit and the identify circuit are disposed on a daughter circuit board. The mother circuit board and the daughter circuit board are butted with each other to form an electric connection. The identify circuit inputs an identify signal to the microprocessor unit, and then the microprocessor unit automatically assigns an input/output port for the signal interface unit according to the identify signal.

Identify circuits corresponding with different signal interface units output different signals, whereby forming different daughter circuit boards. An output end of the microprocessor unit is connected to a power inverter unit. An input end of the microprocessor unit is connected to an output end of a rotor position sensing circuit. The power inverter unit and the rotor position sensing unit are disposed on the mother circuit board. A power supply circuit and an analog sensing unit are also disposed on the mother circuit board. The analog sensing unit detects currents, voltages, and analog signals like NTC of the mother circuit lines on the mainboard. The power supply circuit supplies power to all the circuits. The microprocessor unit is a CPU, a micro control unit (MCU), or a digital signal processor (DSP). A port 3 is disposed on the mother circuit board and includes eleven terminal lugs E, N, L, M1, M2, M3, M4, M5, M6, M7, and M8, of which, the terminal lugs E, N, L are inputs of power supply, M1, M2, M3, M4, M5, M6, M7, M8 are interface signals output from the control system of the user terminal to daughter circuit boards. There may be a plurality of daughter circuit boards. A slot 1 is disposed on the mother circuit board, and a plug connector 2 is disposed on the daughter circuit board. The plug connector 2 is received in the slot 1 whereby electrically connecting the daughter circuit board with the mother circuit board.

However, disadvantages exist in applications of conventional ECMs, which are summarized below, 1) when too many signals interfaces are employed, multiple electric isolations must be designed between daughter circuit boards and the mother circuit board, which results in complicated circuits and high production cost; 2) interface signals need too much resource of the microprocessor unit MCU to process, which affects the running speed; 3) excessive types of daughter circuit boards make the ECM not convenient to be managed and popularized.

SUMMARY OF THE INVENTION

In view of the above-described problems, it is one objective of the invention to provide a daughter circuit board of an electronically commutated motor for interface signal conversion that is simple, easy to correspond with various control systems of user terminals, and accords with the latest electric standard thereby facilitating management and popularization.

To achieve the above objective, in accordance with one embodiment of the invention, there provided is a daughter circuit board of an electronically commutated motor for interface signal conversion, comprising circuit units integrated on the daughter circuit board and five ports for communicating with a control system of a user terminal. The five ports comprise:

a R/T port: a half duplex asynchronous serial communication port;

a Vcc port: an input port of DC power supply, which has a voltage of 8-30 V, and a current of less than 30 mA;

a Common port: a ground line of signal lines and a common terminal of control signals;

a Vsp port: a signal input port of analog control, which has a voltage of 0-6.5 V DC, and a current of less than 1 mA; and an FG port: a signal output port of speed feedback, which outputs n pulses per rotation.

In a class of this embodiment, the daughter circuit board is plugged into a mother circuit board of a motor controller for signal conversion so that the mother circuit board communicates with the control system of the user terminal.

In a class of this embodiment, the circuit units integrated on the daughter circuit board comprise a half duplex asynchronous serial communication unit, one end of which is connected to the R/T port.

In a class of this embodiment, the circuit units integrated on the daughter circuit board further comprise a voltage regulator circuit, an input end of which is connected to the Vcc port, and an output end of which is connected to other circuit units of the daughter circuit board for power supply.

In a class of this embodiment, the circuit units integrated on the daughter circuit board further comprise an open collector output unit, an output end of which is connected to the FG port.

In a class of this embodiment, the circuit units integrated on the daughter circuit board further comprise a microprocessor unit (MCU) of the daughter circuit board, an input end of which is connected to the Vsp port.

In a class of this embodiment, the circuit units integrated on the daughter circuit board further comprise an identify unit, an output end of which is connected to an input end of the mother circuit board.

Advantages of the invention are summarized below: 1) only five ports of the daughter circuit board are employed, thus, the number of the ports, the electric isolation are reduced, and the circuits are simplified, which are beneficial to reduce the production cost; 2) a microprocessor unit is designed on the daughter circuit board, by which signals from a control system of a user terminal can be preprocessed to reduce the resource loss of the microprocessor unit of the mother circuit board, and improve the running speed; 3) the invention employs a simple electric standard and facilitates corresponding with the control system of the user terminal, thereby avoiding involving excessive types of daughter circuit boards and benefiting to manage and popularize.

DETAILED DESCRIPTION OF THE EMBODIMENTS

For further illustrating the invention, experiments detailing a daughter circuit board of an electronically commutated motor for interface signal conversion are described below. It should be noted that the following examples are intended to describe and not to limit the invention.

Figure 6:
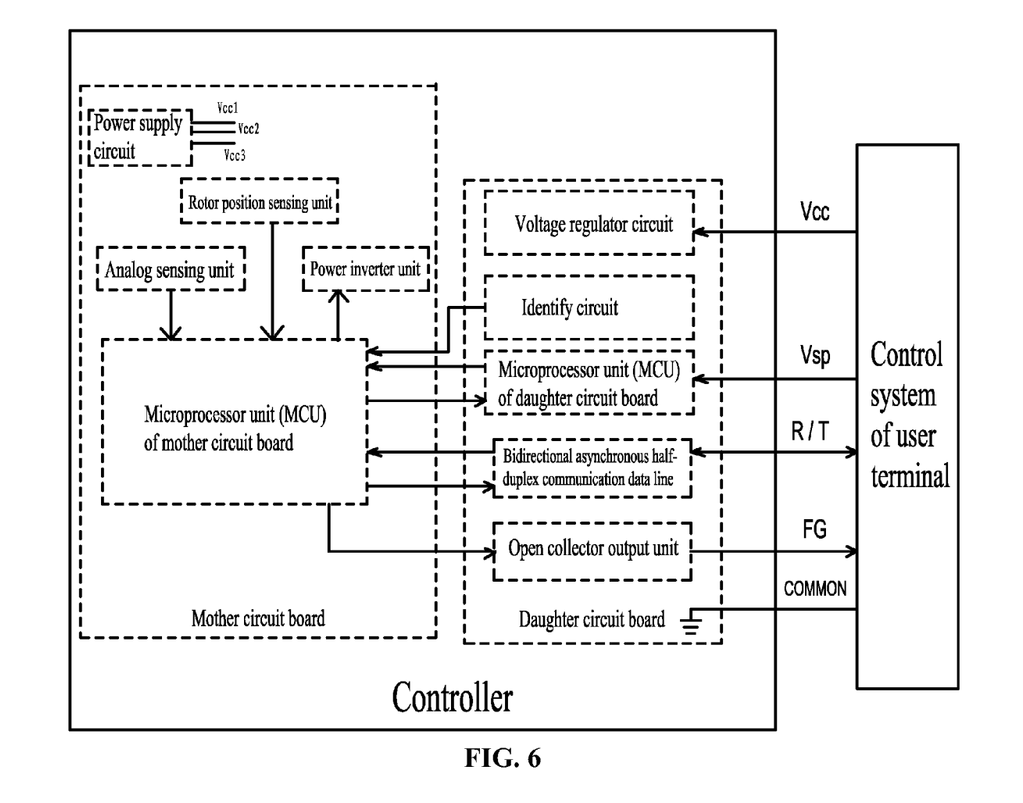
FIG. 6 is a block diagram of a daughter circuit board in accordance with one embodiment of the invention.

As shown in FIG. 6, a daughter circuit board of an electronically commutated motor for interface signal conversion, comprises circuit units integrated on the daughter circuit board and five ports for communicating with a control system of a user terminal. The daughter circuit board is plugged into a mother circuit board of a motor controller for signal conversion so that the mother circuit board communicates with the control system of the user terminal. The five ports comprise:

a R/T port: a half duplex asynchronous serial communication port;

a Vcc port: an input port of DC power supply, which has a voltage of 8-30 V, and a current of less than 30 mA;

a Common port: a ground line of signal lines and a common terminal of control signals;

a Vsp port: a signal input port of analog control, which has a voltage of 0-6.5 V DC, and a current of less than 1 mA; and an FG port: a signal output port of speed feedback, which outputs n pulses per rotation.

The mother circuit board comprises a power circuit, a microprocessor unit of the mother circuit board, a rotor position sensing unit, a power inverter unit, and an analog sensing unit. The daughter circuit board comprises a signal interface circuit. The power circuit supplies power to other circuits. Detection signals from the analog sensing unit and the rotor position sensing unit are input to the microprocessor unit of the mother circuit board, which then sends control signals to the power inverter unit. The circuit units integrated on the daughter circuit board comprise a half duplex asynchronous serial communication unit, one end of which is connected to the R/T port, and another end of which is connected to the microprocessor of the mother circuit board. The circuit units integrated on the daughter circuit board further comprise a voltage regulator circuit, an input end of which is connected to the Vcc port, and an output end of which is connected to other circuit units of the daughter circuit board for power supply. The circuit units integrated on the daughter circuit board further comprise an open collector output unit, an output end of which is connected to the FG port, and an input end of which is connected to the microprocessor of the mother circuit board. The circuit units integrated on the daughter circuit board further comprise a microprocessor unit of the daughter circuit board, an input end of which is connected to the Vsp port, and an output end of which is connected to the microprocessor unit of the mother circuit board through optical coupling. The circuit units integrated on the daughter circuit board further comprise an identify unit, an output end of which is connected to an input end of the mother circuit board, and an input end of which is connected to the microprocessor unit of the mother circuit board.

Figure 7:
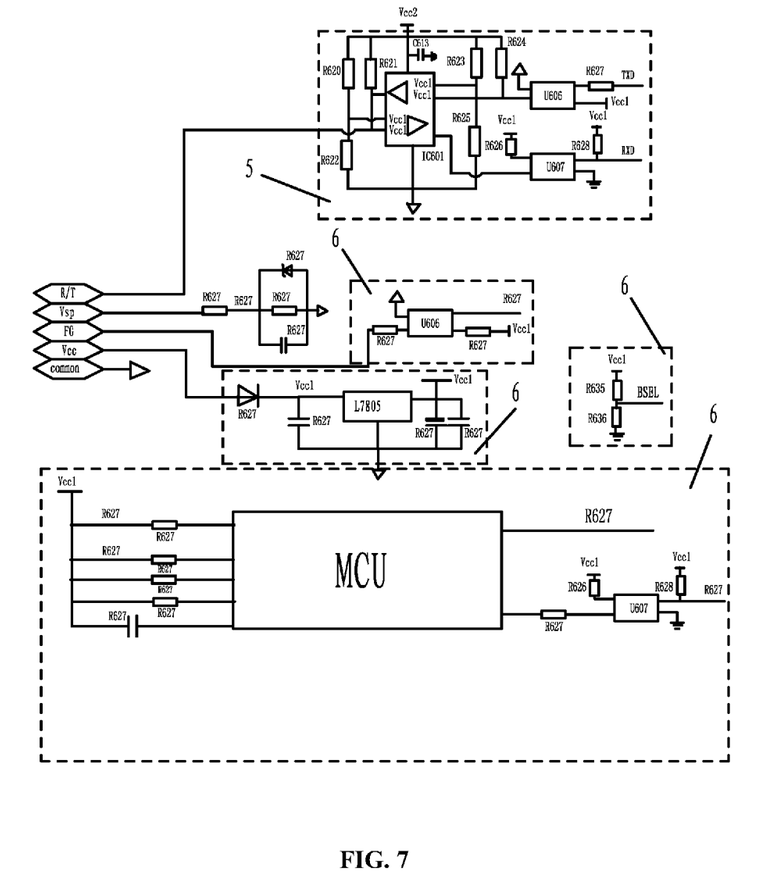
FIG. 7 is a circuit diagram of the daughter circuit board of FIG. 6.

As shown in FIG. 7, the circuit units integrated on the daughter circuit board comprise an identify unit N1, a voltage regulator circuit N4, a half duplex asynchronous serial communication unit N2, a microprocessor unit of daughter circuit board N3, and an open collector output unit N5.

Working principle of the invention is as follows: the control system of the user terminal inputs analog control signals to the microprocessor unit of the daughter circuit board via the Vsp port, after being processed in the microprocessor unit of the daughter circuit board, the analog control signals are converted into digital signals which are then sent to the microprocessor unit of the mother circuit board. The actual speed of the motor is detected and converted into pulse signals by the microprocessor unit of the mother circuit board, through the input end and the output end of the open collector output, and the FG port, the pulse signals are sent to the control system of the user terminal. The control system of the user terminal communicates with the microprocessor unit of the mother circuit board for data transmission via the R/T port and the half duplex asynchronous serial communication unit.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A daughter circuit board of an electronically commutated motor for interface signal conversion, comprising circuit units integrated on the daughter circuit board and five ports for communicating with a control system of a user terminal, wherein the five ports comprise:
   a) a R/T port: a half duplex asynchronous serial communication port;
   b) a Vcc port: an input port of DC power supply, which has a voltage of 8-30 V, and a current of less than 30 mA;
   c) a Common port: a ground line of signal lines and a common terminal of control signals;
   d) a Vsp port: a signal input port of analog control, which has a voltage of 0-6.5 V DC, and a current of less than 1 mA; and
   e) an FG port: a signal output port of speed feedback, which outputs n pulses per rotation.

2. The daughter circuit board of claim 1, wherein the daughter circuit board is plugged into a mother circuit board of a motor controller for signal conversion so that the mother circuit board communicates with the control system of the user terminal.

3. The daughter circuit board of claim 2, wherein the circuit units integrated on the daughter circuit board comprise a half duplex asynchronous serial communication unit, and one end of the half duplex asynchronous serial communication unit is connected to the R/T port.

4. The daughter circuit board of claim 2, wherein the circuit units integrated on the daughter circuit board further comprise a voltage regulator circuit, an input end of the voltage regulator circuit is connected to the Vcc port, and an output end of the voltage regulator circuit is connected to other circuit units of the daughter circuit for power supply.

5. The daughter circuit board of claim 2, wherein the circuit units integrated on the daughter circuit board further comprise an open collector output unit, and an output end of the open collector output unit is connected to the FG port.

6. The daughter circuit board of claim 2, wherein the circuit units integrated on the daughter circuit board further comprise a microprocessor unit of the daughter circuit board, and an input end of the microprocessor unit is connected to the Vsp port.

7. The daughter circuit board of claim 2, wherein the circuit units integrated on the daughter circuit board further comprise an identify unit, and an output end of the identify unit is connected to an input end of the mother circuit board.

8. The daughter circuit board of claim 1, wherein the circuit units integrated on the daughter circuit board comprise a half duplex asynchronous serial communication unit, and one end of the half duplex asynchronous serial communication unit is connected to the R/T port.

9. The daughter circuit board of claim 1, wherein the circuit units integrated on the daughter circuit board further comprise a voltage regulator circuit, an input end of the voltage regulator circuit is connected to the Vcc port, and an output end of the voltage regulator circuit is connected to other circuit units of the daughter circuit for power supply.

10. The daughter circuit board of claim 1, wherein the circuit units integrated on the daughter circuit board further comprise an open collector output unit, and an output end of the open collector output unit is connected to the FG port.

11. The daughter circuit board of claim 1, wherein the circuit units integrated on the daughter circuit board further comprise a microprocessor unit of the daughter circuit board, and an input end of the microprocessor unit is connected to the Vsp port.

12. The daughter circuit board of claim 1, wherein the circuit units integrated on the daughter circuit board further comprise an identify unit, and an output end of the identify unit is connected to an input end of the mother circuit board.

* * * * *